(12) United States Patent
Bhargava et al.

(10) Patent No.: US 7,895,573 B1
(45) Date of Patent: Feb. 22, 2011

(54) EXECUTION ENVIRONMENT FILE INVENTORY

(75) Inventors: Rishi Bhargava, San Jose, CA (US); E. John Sebes, Menlo Park, CA (US)

(73) Assignee: McAfee, Inc., Santa Clara, CA (US)

( * ) Notice: Subject to any disclaimer, the term of this patent is extended or adjusted under 35 U.S.C. 154(b) by 1367 days.

(21) Appl. No.: 11/277,596

(22) Filed: Mar. 27, 2006

(51) Int. Cl.
G06F 9/44 (2006.01)

(52) U.S. Cl. ..................................... 717/120

(58) Field of Classification Search ................ 717/106, 717/127, 135, 140, 170, 120; 709/223; 713/187–188, 713/323; 726/22–24; 705/22, 59
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,155,847 A | 10/1992 | Kirouac et al. | |
| 5,222,134 A | 6/1993 | Waite et al. | 380/4 |
| 5,390,314 A | 2/1995 | Swanson | 395/500 |
| 5,521,849 A | 5/1996 | Adelson et al. | 364/570 |
| 5,560,008 A | 9/1996 | Johnson et al. | 395/650 |
| 5,699,513 A | 12/1997 | Feigen et al. | 395/187.01 |
| 5,778,349 A | 7/1998 | Okonogi | 707/1 |
| 5,787,427 A | 7/1998 | Benantar et al. | |
| 5,842,017 A | 11/1998 | Hookway et al. | 395/707 |
| 5,907,709 A | 5/1999 | Cantey et al. | 395/705 |
| 6,192,401 B1 | 2/2001 | Modiri et al. | |
| 6,275,938 B1 | 8/2001 | Bond et al. | 713/200 |
| 6,338,149 B1 | 1/2002 | Ciccone, Jr. et al. | 714/38 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | 713/151 |
| 6,453,468 B1 | 9/2002 | D'Souza | |

(Continued)

OTHER PUBLICATIONS

Kurt Gutzmann, "Access Control and Session Management in the HTTP Environment,"Jan./Feb. 2001, pp. 26-35, IEEE Internet Computing.

(Continued)

*Primary Examiner*—Tuan Anh Vu
(74) *Attorney, Agent, or Firm*—Patent Capital Group

(57) ABSTRACT

A method is described to maintain (including generate) an inventory of a system of a plurality of containers accessible by a computer system. At least one container is considered to determine whether the container is executable in at least one of a plurality of execution environments characterizing the computer system. Each execution environment is in the group comprising a native binary execution environment configured to execute native machine language instructions and a non-native execution environment configured to execute at least one program to process non-native machine language instructions to yield native machine language instructions. The inventory is maintained based on a result of the considering step. The inventory may be used to exercise control over what executables are allowed to execute on the computer system.

25 Claims, 5 Drawing Sheets

U.S. PATENT DOCUMENTS

| | | | |
|---|---|---|---|
| 6,587,877 B1 | 7/2003 | Douglis et al. | 709/224 |
| 6,662,219 B1 | 12/2003 | Nishanov et al. | |
| 6,748,534 B1* | 6/2004 | Gryaznov et al. | 713/188 |
| 6,769,008 B1 | 7/2004 | Kumar | |
| 6,769,115 B1 | 7/2004 | Oldman | 717/126 |
| 6,832,227 B2 | 12/2004 | Seki et al. | 707/101 |
| 6,834,301 B1 | 12/2004 | Hanchett | 709/223 |
| 6,847,993 B1 | 1/2005 | Novaes et al. | |
| 6,930,985 B1 | 8/2005 | Rathi et al. | 370/254 |
| 6,988,101 B2 | 1/2006 | Ham et al. | 707/10 |
| 6,988,124 B2 | 1/2006 | Douceur et al. | |
| 7,010,796 B1 | 3/2006 | Strom et al. | |
| 7,039,949 B2 | 5/2006 | Cartmell et al. | |
| 7,065,767 B2 | 6/2006 | Kambhammettu et al. | 719/310 |
| 7,082,456 B2 | 7/2006 | Mani-Meitav et al. | 709/203 |
| 7,093,239 B1* | 8/2006 | van der Made | 717/135 |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 | 10/2007 | Gladstone et al. | |
| 7,302,558 B2 | 11/2007 | Campbell et al. | 713/1 |
| 7,330,849 B2 | 2/2008 | Gerasoulis et al. | |
| 7,350,204 B2 | 3/2008 | Lambert et al. | |
| 7,353,501 B2 | 4/2008 | Tang et al. | |
| 7,363,022 B2 | 4/2008 | Whelan et al. | 455/411 |
| 7,370,360 B2* | 5/2008 | van der Made | 726/24 |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,170 B2 | 3/2009 | Finnegan | |
| 7,607,170 B2 | 10/2009 | Chesla | |
| 7,657,599 B2 | 2/2010 | Smith | |
| 7,698,744 B2 | 4/2010 | Fanton et al. | |
| 2002/0099671 A1 | 7/2002 | Mastin Crosbie et al. | 705/500 |
| 2003/0073894 A1 | 4/2003 | Chiang et al. | 600/407 |
| 2003/0074552 A1 | 4/2003 | Olkin et al. | 713/150 |
| 2003/0120601 A1 | 6/2003 | Ouye et al. | |
| 2003/0120811 A1 | 6/2003 | Hanson et al. | 709/245 |
| 2003/0120935 A1 | 6/2003 | Teal et al. | 713/188 |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 | 3/2004 | Hall | |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | 717/168 |
| 2004/0255161 A1 | 12/2004 | Cavanaugh | 713/201 |
| 2005/0018651 A1 | 1/2005 | Yan et al. | 370/352 |
| 2005/0108562 A1* | 5/2005 | Khazan et al. | 713/200 |
| 2005/0114672 A1 | 5/2005 | Duncan et al. | |
| 2005/0228990 A1 | 10/2005 | Kato et al. | 713/167 |
| 2005/0262558 A1 | 11/2005 | Usov | |
| 2005/0273858 A1* | 12/2005 | Zadok et al. | 726/24 |
| 2006/0015501 A1 | 1/2006 | Sanamrad et al. | |
| 2006/0080656 A1* | 4/2006 | Cain et al. | 717/174 |
| 2006/0236398 A1* | 10/2006 | Trakic et al. | 726/24 |
| 2007/0039049 A1 | 2/2007 | Kupferman et al. | |
| 2007/0083522 A1 | 4/2007 | Nord et al. | |
| 2007/0101435 A1 | 5/2007 | Konanka et al. | |
| 2010/0100970 A1 | 4/2010 | Roy-Chowdhury et al. | |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Lanugage Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

* cited by examiner

EXECUTION ENVIRONMENT FILE INVENTORY

CROSS REFERENCE TO RELATED APPLICATIONS

This application is related to the following, all of which are incorporated herein by reference in their entirety:

co-pending U.S. patent application Ser. No. 10/651,591, entitled "Method And System For Containment of Networked Application Client Software By Explicit Human Input" and filed on Aug. 29, 2003;

U.S. patent application Ser. No. 10/651,588, entitled "Damage Containment By Translation" and filed on Aug. 29, 2003, which issued on Dec. 9, 2008 as U.S. Pat. No. 7,464,408;

U.S. patent application Ser. No. 10/806,578, entitled "Containment Of Network Communication" and filed on Mar. 22, 2004, which issued on Aug. 24, 2010 as U.S. Pat. No. 7,783,735;

co-pending U.S. patent application Ser. No. 10/739,230, entitled "Method And System For Containment Of Usage Of Language Interfaces" and filed on Dec. 17, 2003;

co-pending U.S. patent application Ser. No. 10/935,772, entitled "Solidifying the Executable Software Set of a Computer" and filed on Sep. 7, 2004;

co-pending U.S. patent application Ser. No. 11/060,683, entitled "Distribution and Installation of Solidified Software on a Computer" and filed on Feb. 16, 2005;

U.S. patent application Ser. No. 11/122,872, entitled "Piracy Prevention Using Unique Module Translation" and filed on May 4, 2005, which issued on Oct. 13, 2009 as U.S. Pat. No. 7,603,552;

co-pending U.S. patent application Ser. No. 11/182,320, entitled "Classification of Software on Networked Systems" and filed on Jul. 14, 2005; and U.S. patent application Ser. No. 11/346,741, entitled "Enforcing Alignment of Approved Changes and Deployed Changes in the Software Change Life-Cycle" by Rahul Roy-Chowdhury, E. John Sebes and Jay Vaishnav, filed on Feb. 2, 2006 which issued on Jul. 13, 2010 as U.S. Pat. No. 7,757,269.

BACKGROUND OF THE INVENTION

Control of a company's Information Technology (IT) enterprise configuration is valuable not only for logistical reasons, but also for regulatory reasons, including in the areas of enterprise security, regulatory compliance, and change management. A significant aspect of such configuration control may include, for example, controlling what code can run, controlling what parts of the software set are allowed to change under what circumstances, and observing and logging what modifications are made to the code of one or more systems in the enterprise.

SUMMARY OF THE INVENTION

A method is described to maintain (including to generate) an inventory of a system of a plurality of containers accessible by a computer system. At least one container is considered to determine whether the container is executable in at least one of a plurality of execution environments characterizing the computer system. Each execution environment is in the group comprising a native binary execution environment configured to execute native machine language instructions and a non-native execution environment configured to execute at least one program to process non-native machine language instructions to yield native machine language instructions. The inventory is maintained based on a result of the considering step. The inventory may be used to exercise control over what executables are allowed to execute on the computer system.

BRIEF DESCRIPTION OF THE DRAWINGS

FIGS. 2-1 is a flowchart illustrating a method to use an inventory for execution control.

DETAILED DESCRIPTION OF THE PREFERRED EMBODIMENTS

In order to exercise configuration control, a preliminary step may include generating an inventory of the computer's installed software set. Once the inventory is generated, the inventory may evolve as the code configuration of the computer evolves. As configuration control is exercised, the inventory may be employed to make decisions and take resultant actions, and the inventory may be maintained in synchronization with such decisions and actions.

In this detailed description, we discuss aspects of an execution environment inventorying methodology. Before discussing the execution environment inventorying methodology in detail, it is useful to generally discuss some terminology related to an information technology (IT) enterprise environment, including related to a particular computing device and/or system in such an IT enterprise environment.

Figure 1:
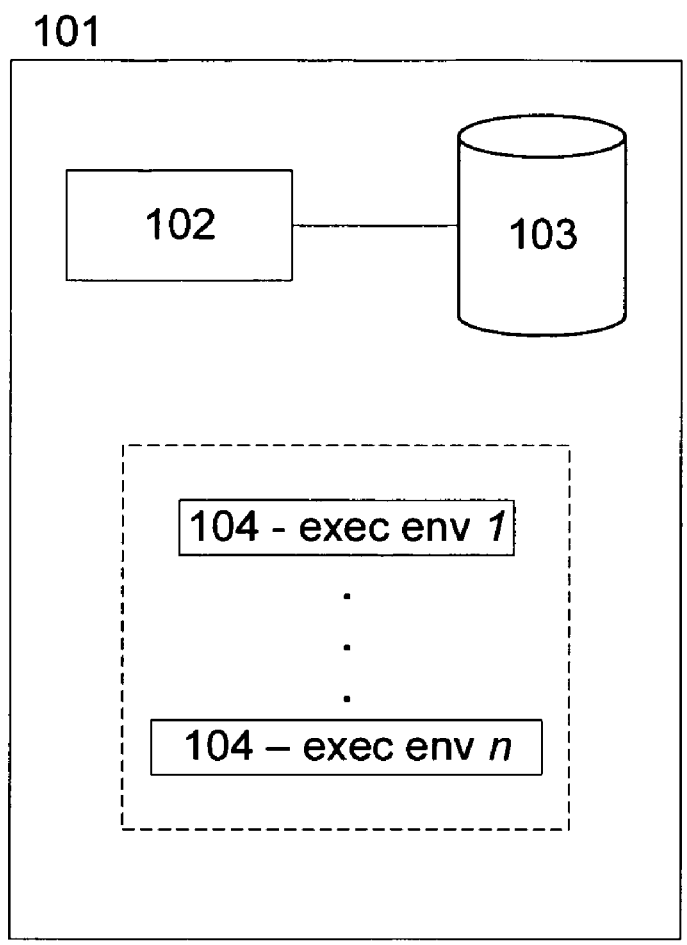
FIG. 1 is a block diagram illustrating a computer characterized by a set of execution environments.

Referring to FIG. 1, a computer system 101 is schematically illustrated. The computer system 101 includes an execution unit 102 which has accessible to it a storage system 103 of files, typically including a file system to manage the files of the storage 103. The computer system 101 is characterized by a set of execution environments 104, to execute various types of programs by the execution unit 102. Execution environments are discussed in more detail below. The concept of files with respect to the inventorying methodology described herein may be generalized to containers that are "persistent host objects," such as is described in co-pending U.S. patent application Ser. No. 11/346,741 (the '741 application), entitled "Enforcing Alignment of Approved Changes and Deployed Changes in the Software Change Life-Cycle" by Rahul Roy-Chowdhury, E. John Sebes and Jay Vaishnav, filed on Feb. 2, 2006. The persistent host objects may include, for example, files, registry entries, DBMS objects or packaged code such as served by an SOA (service oriented architecture).

In particular, a native "binary execution environment" is a mechanism by which execution of native binary code, comprising instructions in the native machine language of the computer system 101, is accomplished by the execution unit 102. In addition to a native binary execution environment, the computer system 101 generally is characterized by a set of other (non-native) execution environments as well. Such a non-native execution environment is a mechanism by which a program, written in a programming language (such as, but not limited to, Java, Perl, Lisp, Visual Basic, Microsoft Word/Excel Macros, etc.) is "run," eventually resulting in the execution of some native binary code, by the execution unit 102, that corresponds to actions indicated by the program. It is noted that the set of execution environments present on a computer can generally be extended or reduced, by installing or uninstalling corresponding pieces of software.

Having generally described characteristics of execution environments, we now discuss some example execution environments. One example execution environment is the native binary execution environment provided by an operating system executing on the computer system. For example, an environment to run executable files (such as those typically designated by a file extension of ".exe") on a Microsoft™ Windows-based computer system with an Intel™ Pentium-based processor architecture, wherein the executable files comprise native instructions for the Intel™ Pentium processor, is an example of a native binary execution environment. Other execution environments, of the non-native type, include interpreters for processing shell scripts, Perl scripts, Java source code or byte code, and Lisp source code programs and resulting in execution of native binary code that corresponds to actions indicated by the source code programs.

Yet other execution environments of the non-native type include execution environments that exist within applications. These execution environments operate to extend the functionality of the applications within which they exist. Examples of such execution environments include a Java Virtual Machine (or a front end to an external Java Virtual Machine) that operates to extend the functionality of a web browser, for example, by processing Java programs (source code or byte code). Another example includes functionality to process Structured Query Language (SQL) code, Microsoft™ Excel macros, and Database Management System (DBMS) macros.

As discussed above, a computer system may be characterized by various execution environments. As a result, there are various "types" of files that can be processed by or according to the execution environments. At a particular point in time, the set of execution environments characterizing a particular computer is determinate. As discussed below, a complete (with respect to existing execution environments) inventory of all the files that can be processed by or according to the execution environments characterizing the computer may be maintained as the configuration of the computer evolves over time, including initially generating the inventory, e.g., based on an initial static configuration.

Figure 2:
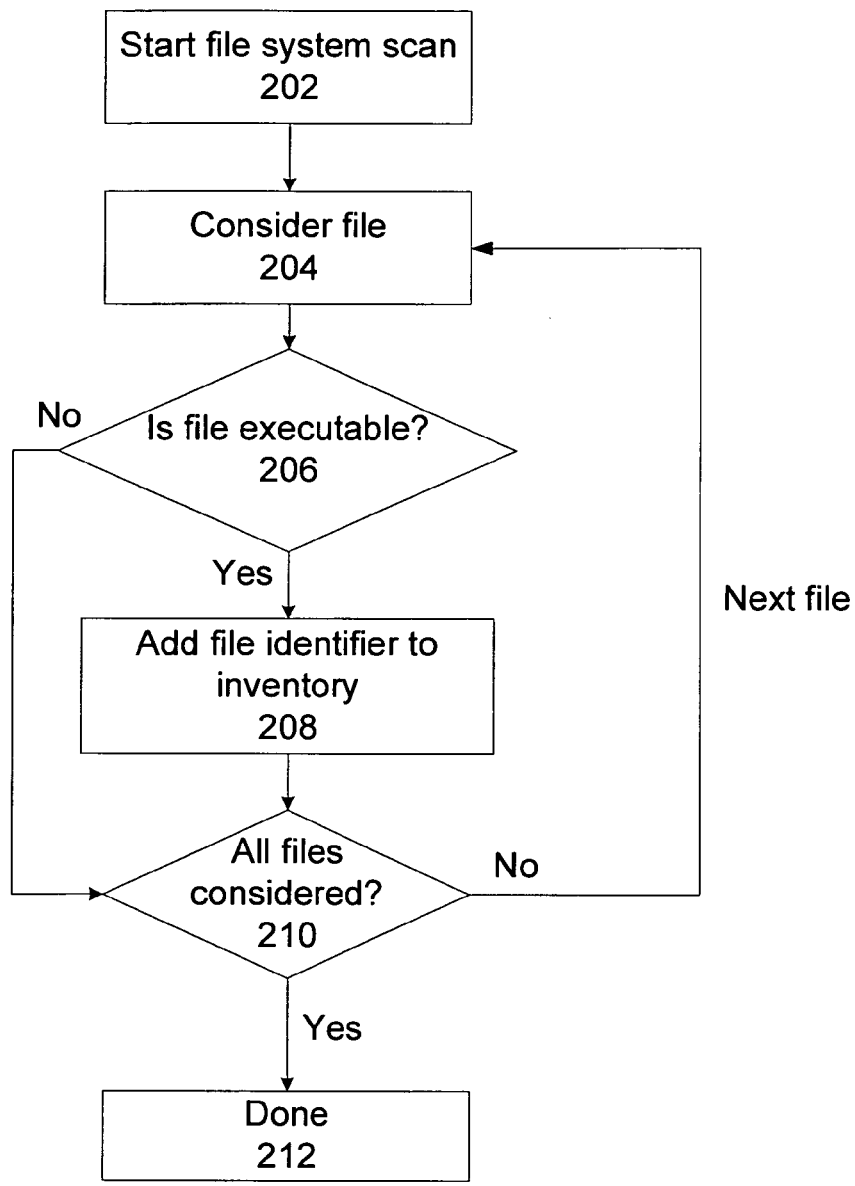
FIG. 2 is a flowchart illustrating an example method to initially generate an inventory of files that are accessible by a computer and that can be processed by or according to the execution environments characterizing the computer.
Figures 1, 2:
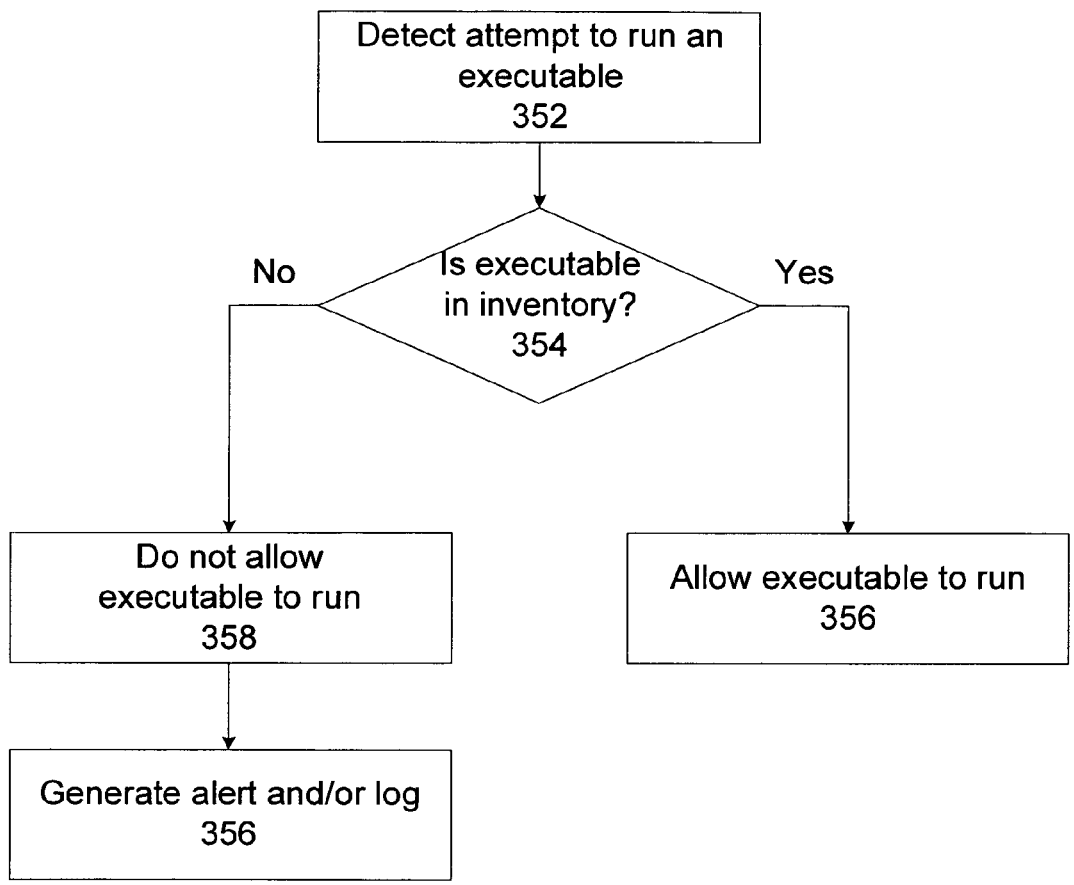

FIG. 2 is a flowchart illustrating an example method to initially generate an inventory of files accessible by a computer and that can be processed by or according to the execution environments characterizing the computer. Basically, each file is considered relative to execution environments characterizing the computer and, based on the consideration, a characterization of the file is cataloged.

At step 202, the file system "scan" is begun. Steps 204, 206, 208 and 210 are executed for each file accessible by the computer (or, perhaps, for some other ascertainable set of files). At step 204, a file is considered. At step 206, it is determined, based on a result of step 204, whether the file can be processed by or according to any of the execution environments characterizing the computer (i.e., in shorthand, is "executable"). If a result of the determination at step 206 is affirmative, then at step 208, an identifier of the file is added to an inventory of files. The identifier of the file may include, for example, a name and/or unique path associated with the file. In some examples, the identifier includes data that is useable to verify the integrity of the file contents, such as a hash, checksum or message digest of the file. At step 210, it is determined if all of the files have been considered. If yes, then processing completes at step 212. Otherwise, processing returns to step 206 where a next file is considered.

Having broadly discussed a method to initially generate an inventory of files, we now discuss specific examples of how to determine that a file is executable (step 206 of FIG. 2). In one example, the contents of the file are examined, such as a file header. For example, a PE (portable executable) header followed by a COFF (common object file format) header and other optional headers may indicate a Microsoft™ Windows executable file. This file content examination may include, for example, parsing and/or pattern-matching against all or portions of the file body. This may be useful, for example, to determine that an Excel data file has macros embedded therein. In another example, metadata or other attributes maintained by the operating system is considered, such as the name and extension associated with the file and/or a file type. In another example, still other information about the file is considered, such as on what machine or repository the file resides, or which gateway or portal provides access to the file (such as in an SOA, as described below). In another example, a name or other external reference to the file is considered, wherein the name or reference is maintained by an information repository or directory and may follow a naming convention or hierarchical referencing which can be used to infer information about the file (as in an SOA).

It is noted that scanning a computer's file system is just one technique for identifying and locating files (which files can then be processed according to step 206), and there are a number of alternative techniques. As one example, if the computer's operating system maintains a full or partial record of the installed software (such as the records maintained by a Microsoft™ Windows OS and available via the "Add or Remove Programs" option in the "Control Panel"), this record can be queried or otherwise examined for files. As another example, if the operating system maintains a full or partial record of available services, the record can be queried or otherwise examined to reveal one or more files involved in providing the services. As another example, if the operating system maintains a full or partial record of the computer's network ports, the record can be queried (for example by using the "netstat" command on a Microsoft™ Windows or Linux-flavored operating system) or otherwise examined to reveal the files involved in listening to the ports, creating connections and/or other processing of the communications on the ports. As another example, if the operating system maintains a full or partial record of the currently loaded drivers or the currently installed drivers, this record can be queried or otherwise examined to reveal files involved in implementing the drivers. In this example, the driver files can optionally be examined to determine whether or not they are signed by their respective vendors. Optionally, files are prevented from being added to the inventory (or otherwise from being designated as "authorized to execute" on the computer, as described below) if they are not properly signed.

Optionally, an exhaustive scanning of the file system can be replaced with a combination of one or more of the alternative file locating techniques described in the previous paragraph to yield a complete and accurate inventory of the system, provided that an additional "dependency analysis" step is performed on the files that are placed into the inventory. That is, for a given file under consideration, the dependency analysis comprises examining the file and identifying other files or components referenced or otherwise used by the file, such as libraries and other executables. These identified objects can then be processed according to step 206 and added to the inventory if appropriate, as well as recursively analyzed for their own dependencies. This methodical hybrid technique can save valuable time and processing resources by eliminating the exhaustive scanning of the file system without sacrificing the completeness or accuracy of the inventory.

It is further noted that, while the discussion has been directed to files, this concept may be generalized to apply to consideration of "containers" generally that may be processed by an execution environment to result in execution of native binary code that corresponds to actions indicated by instructions within the containers. For example, and not by way of limitation, a database management system (DBMS) is an execution environment for stored-procedures (sprocs), and sprocs may be stored in the DBMS itself and not necessarily in separate files. As another example, a JAR (Java ARchive) file may contain compressed information representing one or more Java classes and associated metadata which can be part of a Java program.

Having broadly described an example of initially generating an inventory of files ("containers," generally) accessible by a computer, with regard to execution environments, we now discuss with reference to FIGS. 2-1 how the inventory may be used to exercise execution control. As illustrated by the flowchart in FIGS. 2-1, attempts to run an executable file are detected, and authorization to run the executable file is based on the inventory. Referring to FIGS. 2-1, at step 352, an attempt to run an executable file is detected. At step 354, it is determined whether the executable file is in the inventory. If the executable file is in the inventory, then the executable file is allowed to be run, at step 356. If the executable file is not in the inventory, then the executable file is blocked from being run, at step 358. Furthermore, an alert and/or log may be generated at step 360.

In some examples, the FIGS. 2-1 method is run in what may be termed as "tracking mode." That is, rather than block an executable file from being run, the executable file is allowed to be run (i.e., step 358 is omitted), and the attempt to run the non-inventoried executable file is merely logged. In this way, the effect of execution blocking on a host can be observed without actually substantively changing the operation of the host with respect to running executable files. The log can be studied, if desired, with an eye towards determining whether the inventory includes all of the executable files desired to be in the inventory.

With respect to how to detect and/or block an attempt to change an executable file, the '741 application describes methodology to intercept/detect attempts to change objects, as well as describing methodology to block the intercepted/detected change attempts. Similar methodology may be employed with regard to intercepting/detecting attempts to execute objects, as well as to block the intercepted/detected execution attempts.

Figure 3:
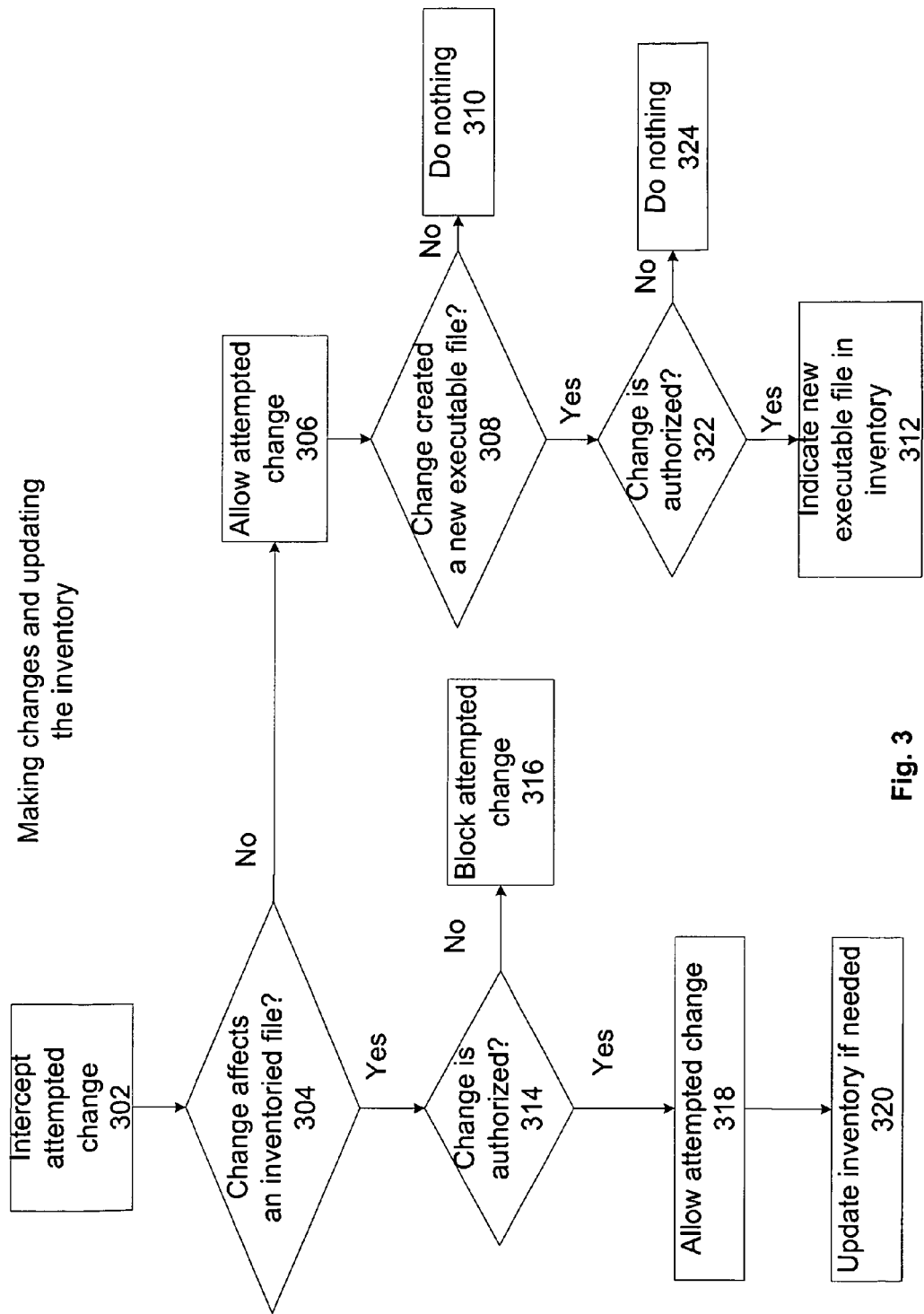
FIG. 3 is a flowchart illustrating a method operating in conjunction with "normal" operation of a computer, to observe the operation of the computer and to maintain the inventory based on the observed operation.

Having broadly described an example of initially generating an inventory of files ("containers," generally) accessible by a computer and using the inventory to exercise execution control, we now discuss with reference to FIG. 3 how the inventory may be maintained over time. In particular, FIG. 3 is a flowchart illustrating a method operating in conjunction with "normal" operation of a computer, to observe the operation of the computer and to maintain the inventory based on the observed operation. More particularly, when it is determined that the operation of the computer is such to attempt a change that may result in the inventory no longer being up to date, then processing is carried out to react to the change.

Referring to FIG. 3, at step 302, an attempted change is detected to the files (or containers, generally) accessible to the computer. At step 304, it is determined if a detected attempted change affects an inventoried file. If the detected attempted change is determined not to affect an inventoried file, then the change is allowed at step 306. At step 308, it is determined if the attempted change created a new file that is executable (e.g., making the determination in a manner similar to that discussed with reference to step 206 in FIG. 2). If a result of step 308 is negative, then processing continues at step 310, where no action results. On the other hand, if a result of step 308 is affirmative, then processing continues at step 322 where it is determined whether the change is authorized (the determination of what changes are authorized is described below). If a result of step 322 is negative, then processing continues at step 324 where no action results. Alternatively, if a result of step 322 is affirmative, then processing continues at step 312, where the new executable file is indicated in the inventory as being executable. If it is determined at step 304 that a detected attempted change does affect an inventoried file, then it is determined at step 314 if the detected attempted change is authorized.

Examples of detecting change attempts to a host object are described, for example, in the '741 application. Furthermore, the '741 application also discusses what may be meant by what "affects" an inventoried file. This may mean, for example, changing the object (e.g., a "write," "rename," "move," or "delete" operation), as well as a change in one or more attributes of the file. In some examples, "affects" may also include "read," "view" or "access" operations, such as in a scenario where some files indicated in the inventory are designated as requiring authorization for such operations. This will in effect allow control over what files (generally containers) can be read, viewed or accessed. In addition, examples of determining what changes are authorized are also described in the '741 application.

Other examples of determining what changes are "authorized" are discussed in greater detail below with reference to FIG. 4. If it is determined that the detected attempted change is not authorized, then the detected attempted change is blocked at step 316. Otherwise, the detected attempted change is allowed at step 318. At step 320, the inventory is updated if required based on the change allowed at step 318. For example, as discussed above, the inventory may include an identifier useable to verify the integrity of the file contents, and the identifier may need to be updated when the file contents, file attributes and/or any associated information in the inventory are changed.

Figure 4:
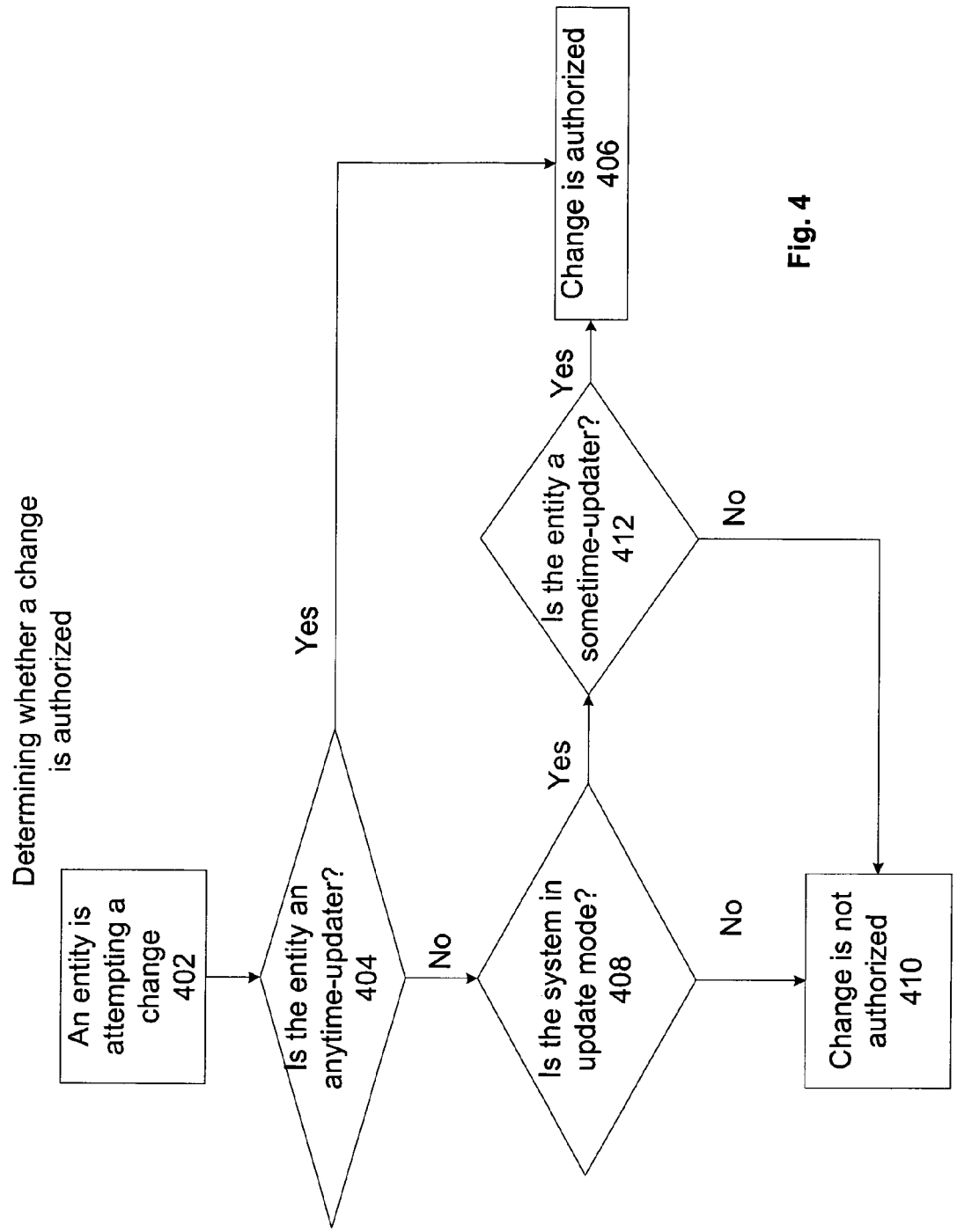
FIG. 4 broadly illustrates an example of how "updaters" interact to determine that a change is authorized.

Having discussed an example of maintaining over time the inventory of files with regard to execution environments, we return to discussing a determination of what changes are authorized, discussed relative to steps 314 and 322 of the FIG. 3 flowchart and with reference to FIG. 4. (Again, reference is also made to the '741 application, which describes how "change authorization policies" can be used to explicitly or implicitly indicate which actors, i.e. users or programs or other entities that initiate changes, are authorized to make what changes to what objects under what circumstances.) The notion of what changes are "authorized" may be flexible but, in one example, changes are authorized only if they are attempted by authorized "updaters."Examples of updaters generally fall within one of the following categories (though, in some systems, there may be no updaters in one or more of the following categories):

anytime updaters: these are programs that are authorized to make changes affecting inventoried files under any condition (e.g., anti-virus software)

sometime updaters: these are programs that are authorized to make changes affecting inventoried files only when the computer is "in update mode" (examples of which are discussed later, in greater detail)

non-updaters: no authority to make changes affecting inventoried files

In another example, "signed updates" and "signed updaters" are employed, using public/private key pairs, digital signatures or other methods for the digital authentication of updates and/or updaters. In this manner, digital authentication may be processed to indicate that an update to a host is authorized. That is, the digital authentication is another way to indicate what changes are authorized.

In one example, inventory maintenance is decoupled from checking for change authorization. That is, the inventory is not used in making authorization decisions. Rather, referring to FIG. 3, step 304 is omitted (as are steps 306, 308, 310 and 312). Thus, at step 314, determining whether a change is authorized is independent of whether the file that is attempted to be changed is in an inventory. The change is either blocked (step 316) or allowed (step 318), and the inventory is updated as appropriate.

FIG. 4 broadly illustrates an example of how the "updaters" interact to determine that a change is authorized. Referring to FIG. 4, processing begins at step 402 where an entity is attempting to make a change to an inventoried file. At step 404, it is determined if the entity attempting to make the change is an anytime updater. If it is determined that the entity is an anytime updater, then the change is authorized at step 406.

If it is determined at step 404 that the entity attempting to make the change is not an anytime updater, then it is determined at step 408 if the system is in update mode. The system is considered to be in update mode if the change authorization policy that is in effect indicates that updates (changes to the system) are allowed by one or more sometime updaters. If it is determined at step 408 that the system is in update mode, then it is determined at step 412 if the entity attempting to make the change is a sometime updater. If it is determined at step 412 that the entity attempting to make the change is a sometime updater, then the change is authorized at step 406. Note that the determination may depend on a number of conditions (as described in the '741 patent), for example on the date and time, the particular updater, the particular nature of the change, the particular attributes of the object to be changed, etc.

If it is determined at step 408 that the system is not in update mode, or if it determined at step 412 that the entity attempting to make the change is not a sometime updater, then the change is not authorized at step 410.

There are some points of flexibility in configuring authorizations. For example, one such point of flexibility is configuring what is an anytime updater (e.g., configuring an authorization such that a change action by a particular user or program or process is always permitted). For example, an authorization may be configured such that processes executing under a particular group ID are anytime updaters. In a similar manner, an authorization may be configured such that a change action by a particular user (e.g., a process executing under a particular user ID) is permitted when the computer is in "update" mode.

Another point of flexibility in configuring authorizations includes defining the conditions, other than defining the particular user, under which a sometime updater is authorized to make changes affecting inventoried files.

Under some conditions, there is some leeway and/or ambiguity regarding the timing with which a file should be indicated in the inventory as executable and, in some circumstances, a file that is executable should nevertheless not be so indicated in the inventory at all. For example, a user may cause a "setup.exe" file to run, the result of which includes attempting to add a set of new executable files to the file system. With regard to timing, the files may be added to the inventory one by one, at each attempt to add an executable file to the disk. Another option includes adding all of the executables to the inventory in a batch.

Furthermore, it is ambiguous whether the setup.exe file itself, which is run only to install a program (including, perhaps, adding a set of new executable files to the file system, as discussed above) and will not need to remain executable beyond the update window should be indicated in the inventory. In fact, the setup.exe may only function to download another executable file, which is an installer, where it is the execution of the installer that causes the program to be "installed." Thus, for example, an update window may be opened before the installer is downloaded. After the installer is downloaded, the installer is executed, and the installer is erased while the update window is still open.

In some examples, the installation process may be such that the operator may have to do some manual cleanup. For example, if the installation includes a "reboot," then this may comprise keeping the update window open across the reboot and closing the update window after the post-reboot installation activities are completed.

It should be noted that the semantics of the inventory may be reduced to the point where, for example, having an entry in the inventory simply means "this container is an executable on this host," without indicating anything about whether the executable is actually authorized to execute on the host. Thus, for example, execution authorization can be relegated to a data structure or mechanism separate from the inventory. As another example, the data structure may simply be represented by additional metadata in the inventory indicating "this executable file is (or is not) actually authorized to execute on this host."

As alluded to above, the concept of "files," and what files are "accessible" to be executed in an execution environment, need not be limited to the traditional notion of files (e.g., an "ordinary" file, existing within the directory structure of an operating system, and that contains either text, data or program). In addition, the "file system" need not be limited to existing on a storage device directly associated with a computer (e.g., residing in a housing that also houses a CPU).

That is, the inventory concept may be generalized as follows:

generalize "files"→"containers"
generalize "local"→"distributed"

The first generalization, from "files" to "containers," has been discussed above. That is, an executable file may contain ordinary code. However, "containers" are more general, and may include files or other "objects" that have code within them but where the files or objects themselves are not typically executed. Examples include Java code containers (such as jar containers) and stored-procedure containers (i.e., containers of "sprocs") which reside within databases and are managed by database management systems. In an SOA environment, code containers may be made available through distributed computing services, such as distributed services that use SOAP (Simple Object Access Protocol) as a common language for requests and responses, etc. In fact, the containers need not be files at all. For example, the containers may include objects in databases, packaged code served by SOAs, etc. While much of the description herein uses files as an example, the described methodology is generally applicable to containers that may be processed by execution environments.

With regard to distributed files, we now discuss two examples. In the first example, a code container is accessible but resides on a remote file system, such as a networked file system or a network share. In this case, in the course of generating an inventory, the remote file system is scanned, and the containers are processed in a manner similar to that discussed above (e.g., with reference to the FIG. 2 flowchart). In one example, prior to scanning the remote file system, it is ascertained that the contents of the remote file system are reachable to be examined. This may be accomplished, for example, by mounting the remote file system on the host where the processing described with reference to the FIG. 2 flowchart are actually carried out.

In another example, code containers are available for access from various repositories via an SOA or similar methodology. Thus, for a particular host (such as the host 101 in FIG. 1), the relevant set of files/containers to consider in creating and/or maintaining an inventory includes files/containers available from the repositories. Thus, the specification of the files/containers to consider includes a specification of the distributed services deemed to be relevant to the host for which the inventory is being generated and/or managed.

In one example, the scanning employs the mechanism provided by the SOA to poll what types of "code containers" are available. Some of these code containers are files, while others can be "stubs" that describe or indicate a particular service that is provided remotely (e.g. remote procedure calls). In any event, the inventory is generated and/or maintained to hold an identification for each code container, similar to manner in which the identification of executable files directly stored on a locally-accessible file storage are held.

In addition to indicating the executable containers in the inventory, non-executable containers may be indicated in the inventory as a way to write-protect or even read-protect the data in the non-executable containers. Thus, for example, meta-data stored in a container (such as a file) and used in maintaining the inventory may be protected in this manner by placing an identification for the meta-data container into the inventory and designating the container as only writeable by those processes that manage the inventory, such that the meta-data cannot be changed except by executing code that is authorized to make such changes. Note that in this case the container is not designated as an executable, but as a write-protected container. Enforcing read-protection can be done in a similar fashion. Note that as a particular example, read-protection and access-protection (or more generally, read-restriction and access-restriction via authorized readers or accessors, defined in analogy with authorized updaters) can be used to control data exfiltration.

In some examples, the methodology described herein is carried out by a computing system under programmed control. In other examples, the methodology described herein is carried out by a person, or in some combination of both.

Having described how to use an inventory for execution control, we now discuss some other particular applications of the inventory aside from execution control. In a first application, enterprise computing asset management is carried out using a centralized aggregate inventory. For example, many enterprises have more (or fewer) licenses than required for particular applications. By comparing an easily generated inventory with the licenses, the licensing can be more closely matched to the actual usage.

In another example, a "gold image" inventory is generated and maintained, representing a baseline inventory for deployment onto one or more hosts. As the hosts operate over time, their own individual inventories and/or their inventory "deltas" (as measured from the gold image inventory) are maintained on the individual hosts. Thus, for example, a certain amount of delta from the gold image inventory may be considered allowable, but additional updates may be blocked if the update would cause the delta to exceed a threshold. The delta may be quantified in any number of ways, for instance as an absolute number of inventory items, as a ratio of the size of the individual inventory to the size of the gold image inventory, as a ratio of the size of the intersection of the individual and gold image inventories to the size of the gold image inventory, or as any other metric that is meaningful to the business.

In another example, efficiency is increased by creating an inventory of a remote repository (e.g., a mountable drive), and then making the ready-made inventory available to individual agents on the individual hosts that have access to the remote repository, either directly or via a central system controller. Thus, the ready-made inventory can be used on individual hosts in order to exercise execution control over the items residing on the remote repository. Note that in general a host may not have sufficient authority over maintaining the inventory of the remote repository in response to changes to the remote repository, or over blocking changes to items as described above. Therefore, it may be useful for the host to check for staleness of inventory items. For example, when a host exercising execution control is processing an attempt to execute a file residing on a remote repository, the host may examine not only that the file has an associated entry in the ready-made inventory, but also that a time stamp of the entry is at least as recent as the creation time stamp of the file. An alternative to using time stamps is using checksums for ensuring that the inventory entries pertain to the exact same file at hand.

In another example, a centrally-maintained inventory of a plurality of hosts is used to make decisions involving knowledge of the set of executable files (or other types of files) on the plurality of hosts. This aggregates information about the plurality of hosts onto a central inventory (aggregate inventory), thereby allowing a centralized analysis of the information. The analysis results can then be used to make decisions or perform actions related to one or more of the plurality of hosts. Actions can be initiated locally on a host or remotely in a way that affects the host. Actions can also be performed in a way that does not directly affect the host, but instead affects a related resource, such as an information repository or a network node, as illustrated with examples below.

One example of using a central inventory is anti-malware processing. A central inventory may be maintained which indicates a union of the executables on the plurality of hosts together with which files reside on which hosts, and this inventory is scanned by anti-virus or other anti-malware code (as opposed to doing anti-virus code-scans separately on each host). The information provided by such a central scan can then form a basis for making decisions pertaining to, or for performing actions on, one or more of the plurality of hosts, just as if the information had been gathered locally on the individual hosts. For example, if a central scan reveals the presence of a virus on a particular host, an action to remove the virus can be caused to be performed on the host. Similarly, if a central scan reveals that a particular networked host is infected with a worm, then one or more elements of a network infrastructure, such as switches, routers, or firewalls can be instructed to isolate, or otherwise monitor or respond to, the infected host, and further action can be performed on the infected host in order to disable the worm.

Another example of using a central inventory is license management. In this example, the central inventory is checked against a record of purchased licenses to perform an analysis indicating which hosts are using which licenses. Follow up steps may include purchasing additional licenses as needed, non-renewal of existing licenses if the analysis indicates unused purchased licenses, removal of software that the analysis indicates is not supposed to be residing on a host, and so on.

Another example of using a central inventory is change and configuration management. In this example, the software resident on a plurality of hosts is managed through authorized channels, such as by using a software provisioning system. Here, a central inventory can be used to indicate software resident on the plurality of hosts, and analysis may include identifying software which, while resident on one or more hosts, lacks a trail indicating its deployment onto the hosts through the authorized channels. Follow up actions may include updating records to more accurately indicate the presence of software on hosts, removal of software that is not supposed to be resident on a host, and so on.

Another example of using a central inventory relates to the above referenced co-pending U.S. patent application Ser. No. 11/182,320, wherein software resident on one or more of a plurality of hosts or other computing elements (such as network nodes, firewalls, etc.) performs some amount of local analysis or pre-processing related to inventoried containers resident on the host or computing element, and sends results of the analysis to a designated entity for further investigation and response. In such a configuration, the designated entity may maintain a central inventory of one or more containers resident on the plurality of hosts or computing elements, and use the sent results from several hosts in combination with the visibility provided by the central inventory in order to reach conclusions regarding trends in the state of the plurality of hosts and cause actions or further analyses to be performed on one or more of the plurality of hosts. For example, if a host identifies a piece of software resident on the host as malware and shares that information with the designated entity, the entity may refer to the central inventory to determine which other hosts may be harboring that piece of software, alert those hosts, and cause a removal or quarantine of the identified malware.

For the above examples using central inventories, note that the union of the inventories of the plurality of hosts (or any other construct of the individual inventories) need not be exact, since even approximate aggregates can save valuable resources as the number of hosts grows. This application of a central inventory can be generalized to any processing that is based on a scan or examination of a plurality of hosts, and the code that scans the centrally-maintained inventory may be, for example, any code for which the inventory provides useful information from which a decision for changing and/or execution may be made. This may include, for example, scanning for adware or spyware, and scanning for copyrighted/licensed material.

The foregoing described embodiments are provided as illustrations and descriptions. The invention is not intended to be limited to the precise form described. Other variations and embodiments are possible in light of above examples, and it is thus intended that the scope of the invention not be limited by this detailed description.

What is claimed is:

1. Container management and protection logic encoded in one or more tangible media for managing a system of containers accessible to a computer system by using an inventory of a plurality of protected containers in the system of containers, the plurality of protected containers being accessible to the computer system from at least one of a locally-accessible storage device, a remotely-accessible file storage system, or a storage repository, wherein each of the protected containers is executable in at least one of a plurality of execution environments characterizing the computer system, the container management and protection logic including code for execution and when executed by one or more processors is operable to perform operations, comprising:

generating the inventory of the plurality of protected containers, the inventory including a plurality of identifiers corresponding respectively to each of the plurality of protected containers, wherein each identifier includes information specific to accessing or locating the corresponding protected container, information uniquely representing the corresponding protected container, or a combination thereof, wherein the inventory is maintained by the container management and protection logic including an interception module, the inventory for use by the interception module;

dynamically intercepting, by the interception module, an operation request on the computer system for a targeted container, the operation request selected from a group consisting of a user-initiated request and a software process initiated request;

identifying the targeted container of the intercepted operation request;

analyzing the inventory of the plurality of protected containers to determine if an identifier corresponding to one of the plurality of protected containers matches that of the targeted container;

allowing the operation request if the operation request is a change request and if it is determined that none of the identifiers corresponding to the plurality of protected containers matches that of the targeted container; and evaluating, if the operation request is allowed, whether an operation resulting from the operation request creates a new container that is executable in at least one of the plurality of execution environments characterizing the computer system, wherein if the new container is created then a new identifier corresponding to the new container is added to the inventory if the operation is authorized.

2. The method of claim 1 wherein:

the attempted operation is an attempted change to the targeted container; and determining, if an identifier corresponding to one of the plurality of protected containers matches that of the targeted container, whether a change resulting from the attempted change is authorized and, if it is determined that the change is authorized, allowing the change.

3. The method of claim 2, wherein:

determining if the change is authorized includes considering an entity attempting to make the change.

4. The method of claim 3, wherein:

if the entity attempting to make the change is an anytime updater, then it is determined that the change is authorized.

5. The method of claim 3, wherein:

if the entity attempting to make the change is a sometime updater and the system is in an update mode with respect to the sometime updater, then it is determined that the change is authorized.

6. The container management and protection logic of claim 1, wherein the software process initiated request includes an automatic software updater.

7. The container management and protection logic of claim 1, wherein each execution environment is in the group comprising:
- a native binary execution environment configured to execute native machine language instructions; and
- a set of non-native execution environments, each execution environment configured to execute at least one program to process non-native machine language instructions to yield native machine language instructions.

8. A method of managing a system of containers accessible to a computer system by generating and using an inventory of a plurality of protected containers in the system of containers, the plurality of protected containers being accessible to the computer system from at least one of a locally-accessible storage device, a remotely-accessible file storage system, or a storage repository, wherein each of the protected containers is executable in at least one of a plurality of execution environments characterizing the computer system, the method comprising:
- evaluating each container in the system of containers to determine whether at least a portion of each container is executable in at least one of the plurality of execution environments characterizing the computer system;
- generating the inventory including a plurality of identifiers corresponding respectively to each of the plurality of protected containers, wherein each identifier includes information specific to accessing or locating the corresponding protected container, information uniquely representing the corresponding protected container, or a combination thereof, wherein the inventory is maintained by container management and protection software including an interception module, the inventory for use by the interception module;
- dynamically intercepting, by the interception module, an operation request on the computer system for a targeted container, the operation request selected from a group consisting of a user-initiated request and a software process initiated request;
- identifying the targeted container of the intercepted operation request;
- analyzing the inventory of the plurality of protected containers to determine if an identifier corresponding to one of the plurality of protected containers matches that of the targeted container;
- allowing the operation request if the operation request is a change request and if it is determined that none of the identifiers corresponding to the plurality of protected containers matches that of the targeted container; and
- evaluating, if the operation request is allowed, whether an operation resulting from the operation request creates a new container that is executable in at least one of the plurality of execution environments characterizing the computer system, wherein if the new container is created then a new identifier corresponding to the new container is added to the inventory if the operation is authorized.

9. The method of claim 8, wherein:
at least one of the containers in the system of containers is a file, and the evaluating each container in the system of containers includes evaluating substantially all contents of the file to determine whether the file is executable in at least one of the plurality of execution environments characterizing the computer system.

10. The method of claim 8, wherein:
the evaluating each container in the system of containers includes evaluating only a portion of contents of a container to determine whether the container is executable in at least one of a plurality of execution environments characterizing the computer system.

11. The method of claim 8, wherein:
the evaluating each container in the system of containers includes evaluating a piece of metadata or an external reference associated with a container to determine whether the container is executable in at least one of the plurality of execution environments characterizing the computer system.

12. The method of claim 8, wherein the software process initiated request includes an automatic software updater.

13. The method of claim 8, wherein each execution environment is in the group comprising:
- a native binary execution environment configured to execute native machine language instructions; and
- a set of non-native execution environments, each execution environment configured to execute at least one program to process non-native machine language instructions to yield native machine language instructions.

14. A method of managing a system of containers accessible to a computer system by using an inventory of a plurality of protected containers in the system of containers, the plurality of protected containers being accessible to the computer system from at least one of a locally-accessible storage device, a remotely-accessible file storage system, or a storage repository, wherein each of the protected containers is executable in at least one of a plurality of execution environments characterizing the computer system, the method comprising:
- providing the inventory of the plurality of protected containers, the inventory including a plurality of identifiers corresponding respectively to each of the plurality of protected containers, wherein each identifier includes information specific to accessing or locating the contents of the corresponding protected container, information uniquely representing the corresponding protected container, or a combination thereof, wherein the inventory is maintained by container management and protection software including an interception module, the inventory for use by the interception module;
- dynamically intercepting, by the interception module, an operation request on the computer system for a targeted container, the operation request selected from a group consisting of a user-initiated request and a software process initiated request;
- identifying the targeted container of the intercepted operation request;
- analyzing the inventory of the plurality of protected containers to determine if an identifier corresponding to one of the plurality of protected containers matches that of the targeted container;

allowing the operation request if the operation request is a change request and if it is determined that none of the identifiers corresponding to the plurality of protected containers matches that of the targeted container; and
- evaluating, if the operation request is allowed, whether an operation resulting from the operation request creates a new container that is executable in at least one of the plurality of execution environments characterizing the computer system, wherein if the new container is created then a new identifier corresponding to the new container is added to the inventory if the operation is authorized.

15. The method of claim 14, wherein:
- the attempted operation is an attempted change to the targeted container; and
- determining, if an identifier corresponding to one of the plurality of protected containers matches that of the targeted container, whether a change resulting from the attempted change is authorized.

16. The method of claim 15, wherein:
the determining whether a change resulting from the attempted change is authorized includes considering an entity attempting to make the change.

17. The method of claim 16, wherein:
if the entity attempting to make the change is an anytime updater, then it is determined that the change is authorized.

18. The method of claim 16, wherein:
if the entity attempting to make the change is a sometime updater and the system is in an update mode with respect to the sometime updater, then it is determined that the change is authorized.

19. The method of claim 14, wherein:
the attempted operation is an attempt to execute the targeted container; and
determining to log the attempt to execute the targeted container if it is determined that none of the identifiers corresponding to the plurality of protected containers matches that of the targeted container.

20. The method of claim 14, wherein:
the attempted operation is an attempt to execute the targeted container; and
determining to keep the targeted container from being executed if it is determined that none of the identifiers corresponding to the plurality of protected containers matches that of the targeted container.

21. The method of claim 20, further comprising:
determining to log the attempt to execute the targeted container if it is determined that none of the identifiers corresponding to the plurality of protected containers matches that of the targeted container.

22. The method of claim 14, wherein the inventory of the plurality of protected containers is aggregated with one or more inventories corresponding to a plurality of host computers to create an aggregate inventory of a plurality of protected containers executable in at least one execution environment of the plurality of host computers, and wherein the computer system is one of the plurality of host computers.

23. The method of claim 22, further comprising:
analyzing the aggregate inventory to determine if a container of the plurality of protected containers of the aggregate inventory represents malware;
identifying which inventory of the aggregate inventory indicates the container representing malware; and
causing removal of the container representing malware from a host computer associated with the identified inventory that indicates the container.

24. The method of claim 14, wherein the software process initiated request includes an automatic software updater.

25. The method of claim 14, wherein each execution environment is in the group comprising:
a native binary execution environment configured to execute native machine language instructions; and
a set of non-native execution environments, each execution environment configured to execute at least one program to process non-native machine language instructions to yield native machine language instructions.

* * * * *

UNITED STATES PATENT AND TRADEMARK OFFICE
CERTIFICATE OF CORRECTION

| | | |
|---|---|---|
| PATENT NO. | : 7,895,573 B1 | Page 1 of 1 |
| APPLICATION NO. | : 11/277596 | |
| DATED | : February 22, 2011 | |
| INVENTOR(S) | : Rishi Bhargava et al. | |

It is certified that error appears in the above-identified patent and that said Letters Patent is hereby corrected as shown below:

In the Claims

At column 12, line 43, claim 2, delete "method" and insert -- container management and protection logic --, therefor.

At column 12, line 52, claim 3, delete "method" and insert -- container management and protection logic --, therefor.

At column 12, line 55, claim 4, delete "method" and insert -- container management and protection logic --, therefor.

At column 12, line 59, claim 5, delete "method" and insert -- container management and protection logic --, therefor.

Signed and Sealed this
First Day of April, 2014

Michelle K. Lee
*Deputy Director of the United States Patent and Trademark Office*